United States Patent
Zhang

(10) Patent No.: US 9,847,886 B2
(45) Date of Patent: Dec. 19, 2017

(54) SLEEPING LINK WAKING METHOD AND APPARATUS

(71) Applicant: Huawei Technologies Co., Ltd., Shenzhen (CN)

(72) Inventor: Mingui Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 178 days.

(21) Appl. No.: 14/808,755

(22) Filed: Jul. 24, 2015

(65) Prior Publication Data
US 2015/0333920 A1 Nov. 19, 2015

Related U.S. Application Data

(63) Continuation of application No. PCT/CN2014/070717, filed on Jan. 16, 2014.

(30) Foreign Application Priority Data

Jan. 25, 2013 (CN) .......................... 2013 1 0029612

(51) Int. Cl.
*H04L 12/12* (2006.01)
*H04W 40/00* (2009.01)
(Continued)

(52) U.S. Cl.
CPC .............. *H04L 12/12* (2013.01); *H04L 45/02* (2013.01); *H04L 69/22* (2013.01);
(Continued)

(58) Field of Classification Search
CPC ......... H04L 12/12; H04L 45/02; H04L 69/22; H04W 40/005; Y02B 60/34; Y02B 60/32; Y02B 60/35
(Continued)

(56) References Cited

U.S. PATENT DOCUMENTS 8,886,832 B2* 11/2014 Caviglia ............. H04L 41/0677
370/216
2006/0133298 A1* 6/2006 Ng .......................... H04L 45/02
370/254
(Continued)

FOREIGN PATENT DOCUMENTS

CN        1527507 A      9/2004
CN      101207555 A      6/2008
(Continued)

OTHER PUBLICATIONS

International Standard, "Information technology—Telecommunications and information exchange between systems—Intermediate System to Intermediate System intra-domain routeing [sic] information exchange protocol for use in conjunction with the protocol for providing the connectionless-mode network service (ISO 8473)," ISO/IEC 10589, Second Edition, Nov. 15, 2002, 210 pages.
(Continued)

*Primary Examiner* — Christine Ng
(74) *Attorney, Agent, or Firm* — Slater Matsil, LLP

(57) ABSTRACT

The present invention discloses a sleeping link waking method and apparatus, and relates to the field of communications network technologies, which can automatically wake a sleeping link in a timely manner according to an actual load condition of a network, and reduce labor maintenance costs. According to embodiments of the present invention, a first router receives a first LSP packet sent by a management router, where the first LSP packet includes a first TLV, and the first TLV is used to determine a sleeping link to be woken; the first router determines, according to the first TLV, the sleeping link to be woken; and the first router wakes the sleeping link. The solutions provided by the embodiments of the present invention are suitable to be used to wake a sleeping link.

17 Claims, 8 Drawing Sheets

(51) Int. Cl.
*H04L 29/06* (2006.01)
*H04L 12/751* (2013.01)

(52) U.S. Cl.
CPC ........... *H04W 40/005* (2013.01); *Y02B 60/32* (2013.01); *Y02B 60/34* (2013.01); *Y02B 60/35* (2013.01)

(58) Field of Classification Search
USPC ........................................ 370/389, 392, 401
See application file for complete search history.

(56) References Cited

U.S. PATENT DOCUMENTS

| | | | | |
|---|---|---|---|---|
| 2007/0268915 | A1* | 11/2007 | Zelig | H04L 12/4625 370/401 |
| 2008/0080500 | A1* | 4/2008 | Shimura | H04L 12/12 370/389 |
| 2009/0279536 | A1* | 11/2009 | Unbehagen | H04L 12/462 370/352 |
| 2012/0026900 | A1* | 2/2012 | Chandrasekaran | H04L 43/0811 370/252 |
| 2012/0106360 | A1* | 5/2012 | Sajassi | H04L 12/437 370/245 |
| 2013/0003746 | A1* | 1/2013 | Klein | H04L 12/10 370/401 |
| 2013/0021943 | A1* | 1/2013 | Lu | H04L 45/023 370/254 |

FOREIGN PATENT DOCUMENTS

| | | |
|---|---|---|
| CN | 101662777 A | 3/2010 |
| CN | 102361474 A | 2/2012 |
| CN | 102395183 A | 3/2012 |
| CN | 103152261 A | 6/2013 |
| WO | 2008016756 A2 | 2/2008 |
| WO | 2010144002 A1 | 12/2010 |

OTHER PUBLICATIONS

Zhang, M., et al., "GreenTE: Power-Aware Traffic Engineering," Network Protocols IEEE 18th International Conference, Oct. 5-8, 2010, pp. 21-30.

* cited by examiner

SLEEPING LINK WAKING METHOD AND APPARATUS

This application is a continuation of International Application No. PCT/CN2014/070717, filed on Jan. 16, 2014, which claims priority to Chinese Patent Application No. 201310029612.9, filed on Jan. 25, 2013, both of which are hereby incorporated by reference in its entirety

TECHNICAL FIELD

The present invention relates to the field of communications network technologies, and in particular, to a sleeping link waking method and apparatus.

BACKGROUND

A large amount of electrical energy needs to be consumed for daily operation of a network, and power consumption spending consumes a large quantity of network operation and maintenance costs. Therefore, generally, when network load is light, network traffic may be aggregated into part of links on the network for transmission, and links, on the network, that bear no network traffic are turned off or in a sleeping state, thereby saving overall power consumption of the network. When the network load rises, in order to avoid network congestion, sleeping links need to be woken.

In the prior art, a sleeping link is generally woken in the following two manners: in a first manner, a sleeping link is woken by using a timer, that is, when the link enters a sleeping state, a timer for the sleeping link is set, and when the timer expires, an event for waking the sleeping link is triggered and the sleeping link is woken; and in a second manner, a sleeping link is woken by means of network management, that is, a network administrator records and maintains a state of a link, and when the network administrator makes, by determining network load, a decision that a sleeping link needs to be woken, the network administrator delivers an instruction according to a network management protocol, to wake the sleeping link.

However, when a sleeping link is woken by using a timer, actual load of a network cannot be responded to, and therefore, the sleeping link cannot be woken according to the actual load of the network in a timely manner; and when the sleeping link is woken by means of network management, labor maintenance costs are increased, and the sleeping link cannot be woken automatically.

SUMMARY

Embodiments of the present invention provide a sleeping link waking method and apparatus, which can automatically wake a sleeping link in a timely manner according to an actual load condition of a network, and reduce labor maintenance costs.

According to a first aspect, the present invention provides a sleeping link waking method, including receiving, by a first router, a first LSP packet sent by a management router, where the first LSP packet includes a first TLV, and the first TLV is used to determine a sleeping link to be woken; determining, by the first router according to the first TLV, the sleeping link to be woken; and waking, by the first router, the sleeping link.

With reference to the first aspect, in a first possible embodiment, the determining, by the first router according to the first TLV, the sleeping link to be woken includes: parsing, by the first router, the first LSP packet to acquire the first TLV; reading, by the first router, the first TLV to acquire a link record included in the first TLV; and determining, by the first router, that the sleeping link to be woken is a link marked by the link record.

With reference to the first possible embodiment of the first aspect, in a second possible embodiment, the link record includes a primary Media Access Control (MAC) address and a secondary MAC address.

With reference to the second possible embodiment of the first aspect, in a third possible embodiment, the determining, by the first router, that the sleeping link to be woken is a link marked by the link record includes: determining, by the first router, that the sleeping link to be woken is a link between the first router and a second router, where the first router is a router corresponding to the primary MAC address in the link record, and the second router is a router corresponding to the secondary MAC address in the link record.

With reference to the third possible embodiment of the first aspect, in a fourth possible embodiment, the waking, by the first router, the sleeping link includes: sending, by the first router, a wake command to a line card included in the first router; regularly sending, by the first router, a packet to a router connected to the first router. When the packet sent by the router corresponding to the secondary MAC address is received, the method includes determining, by the first router, that the line card included in the first router has been woken according to the wake command and is in a working state, and determining that the sleeping link enters a woken state.

With reference to the fourth possible embodiment of the first aspect, in a fifth possible embodiment, after the waking, by the first router, the sleeping link, the method further includes sending, by the first router, a second LSP packet, where the second LSP packet is used to notify the router connected to the first router that the sleeping link has entered the woken state.

According to a second aspect, the present invention provides a sleeping link waking method, including acquiring and recording, by a management router, sleeping link information; determining, by the management router according to the sleeping link information, two routers connected to a sleeping link; and sending, by the management router, a first Link State Protocol Data Unit (LSP) packet to the two routers, so as to wake the sleeping link between the two routers, where the first LSP packet includes a first Type, Length, and Value (TLV), and the first TLV is used to determine the sleeping link to be woken.

With reference to the second aspect, in a first possible embodiment, the acquiring and recording, by a management router, sleeping link information includes: receiving, by the management router, a third LSP packet sent by a router except the two routers connected to the sleeping link, where the third LSP packet includes a third TLV, and the third TLV is used to determine the sleeping link information; parsing, by the management router, the third LSP packet to acquire the third TLV; reading, by the management router, the third TLV to acquire a link record included in the third TLV; determining, by the management router, that the sleeping link is a link marked by the link record, and determining the two routers connected to the sleeping link; and recording, in a link state database, the sleeping link and the two routers connected to the sleeping link.

With reference to the first possible embodiment of the second aspect, in a second possible embodiment, the determining, by the management router according to the sleeping link information, two routers connected to a sleeping link includes: acquiring, by the management router and in the link state database, the two routers connected to the sleeping link.

With reference to the second possible embodiment of the second aspect, in a third possible embodiment, the link record includes a primary MAC address and a secondary MAC address.

With reference to the third possible embodiment of the second aspect, in the fourth possible embodiment, the two routers connected to the sleeping link are a first router and a second router; and the determining, by the management router, that the sleeping link is a link marked by the link record includes: determining, by the management router, that the sleeping link is a link between the first router and the second router, where the first router is a router corresponding to the primary MAC address in the link record, and the second router is a router corresponding to the secondary MAC address in the link record.

According to a third aspect, the present invention provides a sleeping link waking apparatus, including: a receiving unit, configured to receive a first LSP packet sent by a management router, where the first LSP packet includes a first type, length, and value TLV, and the first TLV is used to determine a sleeping link to be woken. A determining unit is configured to determine according to the first TLV, the sleeping link to be woken. A processing unit is configured to wake the sleeping link.

With reference to the third aspect, in a first possible embodiment, the determining unit includes: a parsing module, configured to parse the first LSP packet to acquire the first TLV. A reading module is configured to read the first TLV to acquire a link record included in the first TLV. A determining module is configured to determine that the sleeping link to be woken is a link marked by the link record.

With reference to the first possible embodiment of the third aspect, in a second possible embodiment, the link record includes a primary MAC address and a secondary MAC address.

With reference to the second possible embodiment of the third aspect, in a third possible embodiment, the determining module is configured to determine that the sleeping link to be woken is a link between a first router and a second router, where the first router is a router corresponding to the primary MAC address in the link record, and the second router is a router corresponding to the secondary MAC address in the link record.

With reference to the third possible embodiment of the third aspect, in a fourth possible embodiment, the processing unit includes: a sending module configured to send a wake command to a line card included in the apparatus. The sending module is further configured to regularly send a packet to a router connected to the apparatus. A determining module is configured to: when the packet sent by the router corresponding to the secondary MAC address is received, determine that the line card included in the first router has been woken according to the wake command and is in a working state, and determine that the sleeping link enters a woken state.

With reference to the fourth possible embodiment of the third aspect, in a fifth possible embodiment, the apparatus further includes: a sending unit, configured to send a second LSP packet, where the second LSP packet is used to notify the router connected to the apparatus that the sleeping link has entered the woken state.

According to a fourth aspect, the present invention provides a sleeping link waking apparatus, including: an acquiring unit, configured to acquire and record sleeping link information. A determining unit is configured to determine according to the sleeping link information, two routers connected to a sleeping link. A sending unit is configured to send a first LSP packet to the two routers, so as to wake the sleeping link between the two routers, where the first LSP packet includes a first TLV, and the first type, length, and value TLV is used to determine the sleeping link to be woken.

With reference to the fourth aspect, in a first possible embodiment, the acquiring unit includes a receiving module configured to receive a third LSP packet sent by a router except the two routers connected to the sleeping link, where the third LSP packet includes a third TLV, and the third TLV is used to determine the sleeping link information. A parsing module is configured to parse the third LSP packet to acquire the third TLV. A reading module is configured to read the third TLV to acquire a link record included in the third TLV. A determining module is configured to determine that the sleeping link is a link marked by the link record, and determine the two routers connected to the sleeping link. A recording module is configured to record, in a link state database, the sleeping link and the two routers connected to the sleeping link.

With reference to the first possible embodiment of the fourth aspect, in a second possible embodiment, the determining unit is configured to acquire, in the link state database, the two routers connected to the sleeping link.

With reference to the second possible embodiment of the fourth aspect, in a third possible embodiment, the link record includes a primary MAC address and a secondary MAC address.

With reference to the third possible embodiment of the fourth aspect, in a fourth possible embodiment, the two routers connected to the sleeping link are a first router and a second router. The determining module is configured to determine that the sleeping link is a link between the first router and the second router, where the first router is a router corresponding to the primary MAC address in the link record, and the second router is a router corresponding to the secondary MAC address in the link record.

According to the sleeping link waking method and apparatus provided by the embodiments of the present invention, a first router receives a first LSP packet sent by a management router, where the first LSP packet includes a first TLV, and the first TLV is used to determine a sleeping link to be woken; the first router determines, according to the first TLV, the sleeping link to be woken; and the first router wakes the sleeping link. In the prior art, when a sleeping link is woken by using a timer, actual load of a network cannot be responded to, and therefore, the sleeping link cannot be woken in a timely manner according to the actual load of the network; and when the sleeping link is woken by means of network management, labor maintenance costs are increased, and the sleeping link cannot be woken automatically. Compared with that, in the embodiments of the present invention, by using a newly-defined first TLV, a sleeping link to be woken can be determined, and the sleeping link can be woken, so that the sleeping link can be automatically woken in a timely manner according to an actual load condition of a network, and labor maintenance costs are reduced.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
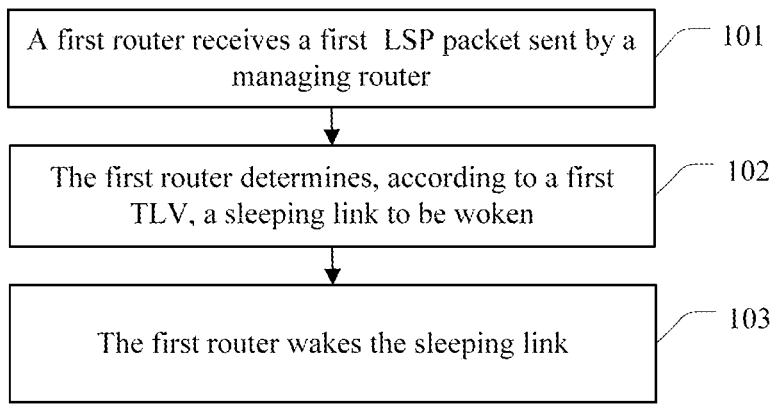
FIG. 1 is a flowchart of a sleeping link waking method (executed by a first router) according to Embodiment 1 of the present invention.

This embodiment of the present invention provides a sleeping link waking method, and as shown in FIG. 1, the method includes:

Step 101: A first router receives a first Link State Protocol Data Unit (LSP) packet sent by a management router, where the first LSP packet includes a first Type, Length and Value (TLV), and the first TLV is used to determine a sleeping link to be woken.

In this embodiment, the first router is a router associated with the sleeping link. For example, the first router is either of two routers connected to a sleeping link. The management router is a router having a highest priority on a network, or a centralized controller that accesses a network. The management router is a server that may run an Intermediate System to Intermediate System (ISIS) routing protocol.

The first LSP packet carries the first TLV, where the first TLV includes a link type and a link record. The link type may include a woken link Wake Links or a sleeping link Sleeping Links, and the link type in the first TLV is the woken link; and the link record includes a primary Media Access Control (MAC) address and a secondary MAC address. In a schematic structural diagram of a TLV shown in FIG. 2, a Type field represents a link type, and a Type may be a woken link Wake Links; a Length represents a length of the TLV; and a link record is determined by a Link Records field. For example, the link record may include the primary MAC address and the secondary MAC address, where there may be N Link Records fields, and N is greater than or equal to 1. For another example, the link record may include a Subnetwork Point of Attachment (SNPA), and a router connected to the sleeping link may be determined by using an SNPA address. The present invention is described in detail by using an example in which the link record includes the primary MAC address and the secondary MAC address.

It should be noted that, the first TLV is carried in an LSP packet, and is flooded on the network, where the network refers to a network managed by the management router, and includes the first router; and flooding may be understood as sending the LSP packet in a broadcasting manner.

Step 102: The first router determines, according to the first TLV, the sleeping link to be woken.

In this embodiment, the sleeping link to be woken is determined according to the link type and the link record in the first TLV. That is, when the link type is the woken link, it is determined that a link between the first router and a second router is the sleeping link to be woken, where the first router is a router corresponding to the primary MAC address (The Primary Mac Address) in the link record, and the second router is a router corresponding to the secondary MAC address (The Secondary Mac Address) in the link record.

Step 103: The first router wakes the sleeping link.

Waking the sleeping link includes waking a line card (Line-Card) included in the router connected to the sleeping link. In this embodiment, the first router wakes the line card included in the first router. It should be noted that, one router may be connected to multiple routers, and therefore, multiple line cards may be included in one router. One line card identifies one router, and the identified router is a router connected to the router in which the line card is located. Therefore, the line card that needs to be woken and is in the first router may be determined according to the router corresponding to the secondary MAC address.

According to the sleeping link waking method provided by this embodiment of the present invention, a sleeping link to be woken is determined according to a first TLV in a first LSP packet received by a first router, and the sleeping link is woken, so that the sleeping link may be automatically woken in a timely manner according to an actual load condition of a network, and labor maintenance costs are reduced.

Figure 3:
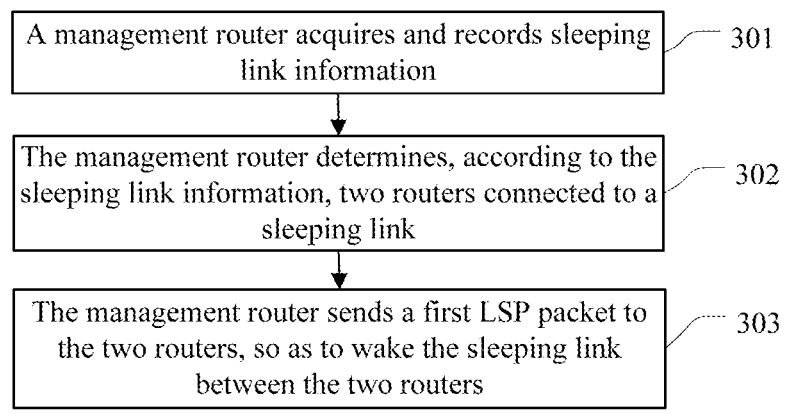
FIG. 3 is a flowchart of a sleeping link waking method (executed by a management router) according to Embodiment 1 of the present invention.

This embodiment of the present invention provides another sleeping link waking method, and as shown in FIG. 3, the method includes:

Step 301: A management router acquires and records sleeping link information.

The management router is a router having a highest priority on a network, or a centralized controller that accesses a network. The management router is a server that may run an intermediate system to intermediate system routing protocol ISIS.

In this embodiment, a router except two routers connected to a sleeping link sends the sleeping link information to the management router. It should be noted that, the management router learns the sleeping link information by using an ISIS control layer, where the control layer is used to coordinate working of all routers on the network, for example, to turn on or off a router. In addition, when learning that the sleeping link should be woken, the two routers connected to the sleeping link directly wake the sleeping link by using a local processing unit.

In this embodiment, optionally, the management router receives a third LSP packet sent by a router except the two routers connected to the sleeping link, where the third LSP packet includes a third TLV, and the third TLV is used to determine the sleeping link information.

The management router parses the third LSP packet to acquire the third TLV.

The management router reads the third TLV to acquire a link record included in the third TLV.

The management router determines that the sleeping link is a link marked by the link record, and determines the two routers connected to the sleeping link.

The sleeping link and the two routers connected to the sleeping link are recorded in a link state database. It may be understood that, the sleeping link information stored in the link state database includes the sleeping link and the two routers connected to the sleeping link.

In the foregoing embodiment, the router except the two routers connected to the sleeping link sends the sleeping link information to the management router. In another possible implementation manner, the management router acquires the sleeping link information from a module of the management router.

Step 302: The management router determines, according to the sleeping link information, two routers connected to a sleeping link.

Optionally, the management router acquires, in the link state database, the two routers connected to the sleeping link. An objective of determining the routers is that: the management router may wake the sleeping link by performing an operation on the routers connected to the sleeping link, so as to avoid network congestion, and improve network quality.

Step 303: The management router sends a first LSP packet to the two routers, so as to wake the sleeping link between the two routers, where the first LSP packet includes a first TLV, and the first TLV is used to determine the sleeping link to be woken.

Optionally, when network load rises, or another path on the network is faulty, the management router sends the first LSP packet to the two routers connected to the sleeping link, so as to wake the sleeping link between the two routers. Certainly, in this embodiment of the present invention, the sleeping link between the two routers may be also waken in another scenario, and this embodiment of the present invention sets no limitation on a scenario in which the management router wakes the sleeping link between the two routers.

It should be noted that, the management router may send, by using an ISIS data layer, the first LSP packet to all routers managed by the management router, that is, the management router floods the first LSP packet on the network, which can ensure that both the two routers connected to the sleeping link receive the packet, and further perform an corresponding operation according to the packet.

The first LSP packet carries the first TLV, where the first TLV includes a link record, and the link record includes a primary MAC address and a secondary MAC address. The first TLV may further include a link type, where the link type may include a woken link Wake Links or a sleeping link Sleeping Links. The link type in the first TLV is the woken link. In a schematic structural diagram of a TLV shown in FIG. 2, a Type field represents a link type; and a Length represents a length of the TLV. The link record is determined by a Links Records field. In this step, the link type in the first TLV is the woken link.

According to the sleeping link waking method provided by this embodiment of the present invention, a management router receives sleeping link information sent by a router connected to a sleeping link; sends a first LSP packet to all managed routers according to the sleeping link information, so as to ensure that routers on both ends of the sleeping link receive the first LSP packet, and perform further processing, so that the sleeping link may be automatically woken in a timely manner according to an actual load condition of a network, and labor maintenance costs are reduced.

Figure 4:
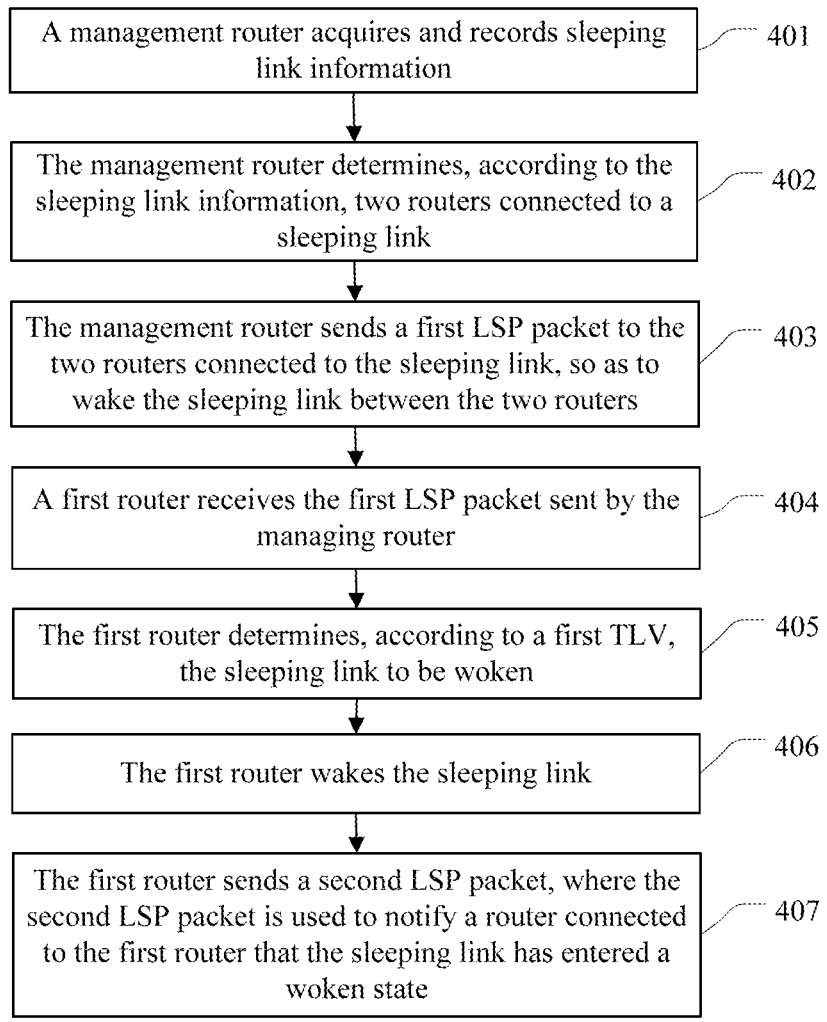
FIG. 4 is a flowchart of another sleeping link waking method according to Embodiment 1 of the present invention.

This embodiment of the present invention provides a sleeping link waking method, and as shown in FIG. 4, the method includes:

Step 401: A management router acquires and records sleeping link information.

The management router is a router having a highest priority on a network, or a centralized controller that accesses a network. The management router is a server that may run an intermediate system to intermediate system routing protocol ISIS.

In this step, that a management router acquires and records sleeping link information includes that: the management router receives a third LSP packet sent by a router except two routers connected to a sleeping link, where the third LSP packet includes a third TLV, and the third TLV is used to determine the sleeping link information.

Optionally, the router except the two routers connected to the sleeping link acquires the sleeping link information by using an LSP packet sent by the two routers connected to the sleeping link.

Then, the management router parses the third LSP packet to acquire the third TLV; and according to the acquired third TLV, reads the third TLV, and acquires a link record included in the third TLV. The link record included in the third TLV includes a primary MAC address and a secondary MAC address, where the primary MAC address in the third TLV is a MAC address corresponding to R7, and the secondary MAC address is a MAC address corresponding to R8; or, the primary MAC address is a MAC address corresponding to R8, and the secondary MAC address is a MAC address corresponding to R7. In addition, the third TLV further includes a Type, where the Type may be a woken link. It should be noted that, the link record may further include a subnetwork point of attachment SNPA, and a router connected to the sleeping link may be determined by using an SNPA address. The present invention is described in detail by using an example in which the link record includes the primary MAC address and the secondary MAC address.

Then, according to the link record that is read, the management router determines that the sleeping link is a link marked by the link record, and determines the two routers connected to the sleeping link. It may be understood that, the sleeping link information stored in a link state database includes the sleeping link and the two routers connected to the sleeping link.

That is, the management router determines that the sleeping link is a link between a first router and a second router, where the first router is a router corresponding to the primary MAC address in the link record, and the second router is a router corresponding to the secondary MAC address in the link record.

The link state database stores states of all links on a network managed by the management router, which may include a woken link or a sleeping link, where the woken link is a link working normally, and the sleeping link is a link that does not work temporarily. After the sleeping link is woken, the sleeping link is turned into a woken link, which in this case, may work normally. It should be noted that, the management router learns the sleeping link information by using an ISIS control layer, where the control layer is used to coordinate working of all routers on the network, for example, to turn on or off a router.

"Third" in the third LSP packet is not used for sequencing, but for convenience of description; and likewise, "third" in the third TLV is not used for sequencing, but for convenience of description.

A TLV is a Type, Length and Value. The TLV is, in an ISIS protocol, a common manner of defining a field in a protocol data unit. The TLV may be further defined by nesting, that is, another TLV is further defined in a Value field of the TLV, so as to facilitate expansion of the TLV. The TLV that is defined by nesting is generally referred to as a sub-TLV. In this embodiment, the TLV may be an ordinary TLV, and may also be a sub-TLV. The present invention does not set a limitation on a type of the TLV, as long as the TLV includes Type, Length and Value fields. The Type field represents a link type, and the link type includes a woken link or a sleeping link; the Length field identifies a length of the TLV, so as to ensure that the TLV may be correctly read; and the Value field represents a link record, where the link record includes a primary MAC address and a secondary MAC address.

Figure 2:
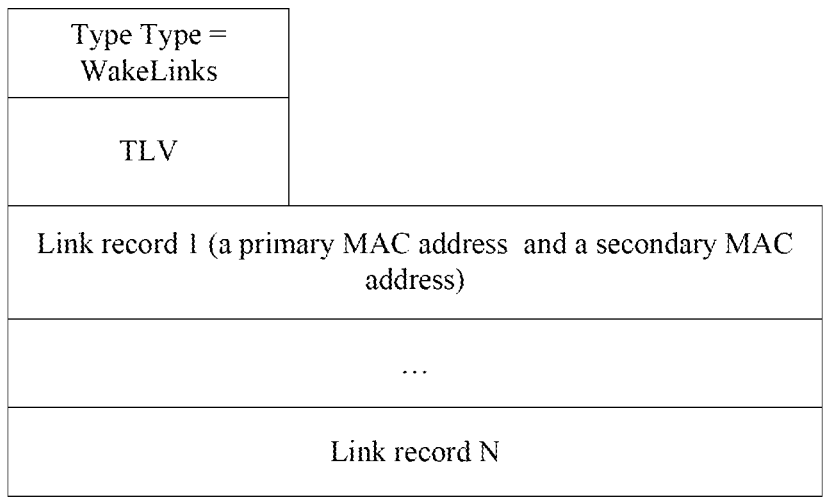
FIG. 2 is a schematic structural diagram of a TLV according to Embodiment 1 of the present invention.

In a schematic structural diagram of a TLV shown in FIG. 2, the TLV includes a link type and a link record, and further includes a length of the TLV, where the link type is a sleeping link, and the link record includes a primary MAC address and a secondary MAC address.

Figure 5:
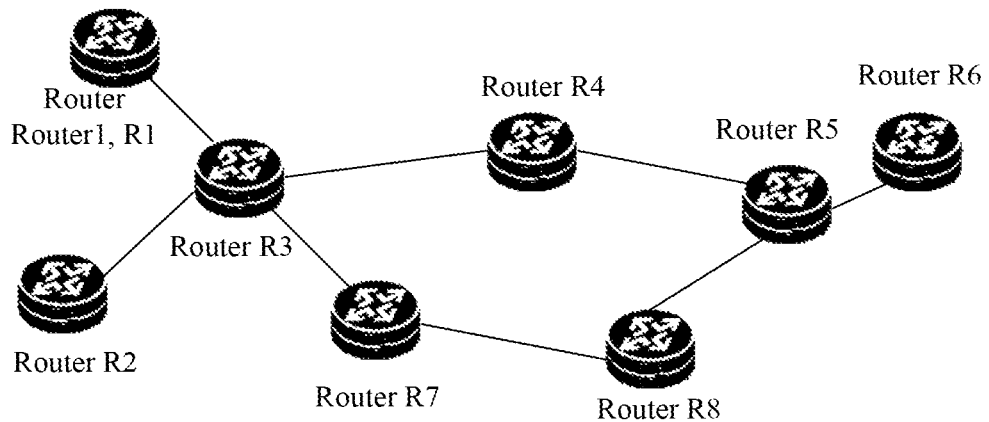
FIG. 5 is a schematic diagram of a network according to Embodiment 1 of the present invention.

In a schematic diagram shown in FIG. 5, a router 1 (Routed, R1) is a management router. It is assumed that a link R7-R8 is in a sleeping state, the routers R7 and R8 separately send a third LSP packet including sleeping link information to the R1. It should be noted that, in this embodiment, the third LSP packets separately sent by the R7 and the R8 to the R1 are different. However, both the third LSP packets include a third TLV. Any one router of routers R2, R3, R4, R5, and R6 sends a third LSP packet to the R1, where the third LSP packet includes the third TLV, and the third TLV is used to determine the sleeping link information. Preferably, the R2, the R3, the R4, the R5, and the R6 each sends a third LSP packet to the R1, so as to ensure that the R1 may receive the third LSP packet, and determine the sleeping link information.

In this case, the sleeping link information recorded by the management router includes the sleeping link between the R7 and the R8, and the R7 and the R8 connected to the sleeping link.

Optionally, the management router may further acquire the sleeping link information from a local storage device, where the sleeping link information may be stored in the local storage device by an administrator.

Step 402: The management router determines, according to the sleeping link information, two routers connected to a sleeping link.

In this step, that the management router determines, according to the sleeping link information, two routers connected to a sleeping link includes that: the management router acquires, in the link state database, the two routers connected to the sleeping link.

Step 403: The management router sends a first LSP packet to the two routers connected to the sleeping link, so as to wake the sleeping link between the two routers, where the first LSP packet includes a first TLV, and the first TLV is used to determine the sleeping link to be woken.

Optionally, when network load rises, or another path on the network is faulty, the management router sends the first LSP packet to the two routers connected to the sleeping link, so as to wake the sleeping link between the two routers. Certainly, in this embodiment of the present invention, the sleeping link between the two routers may also be waken in another scenario, and this embodiment of the present invention sets no limitation on a scenario in which the management router wakes the sleeping link between the two routers.

It should be noted that, when detecting that the network load rises, or the another path on the network is faulty, the management router needs to wake the sleeping link in order to avoid network congestion. In this case, the management router sends the first LSP packet to all routers on the network managed by the management router. That is, management router floods the first LSP packet on the network, so as to ensure that the two routers connected to the sleeping link may receive the first LSP packet. After the routers connected to the sleeping link receive the first LSP packet, the sleeping link is woken. After receiving the first LSP packet, the other routers working normally ignore the packet, and continue to work normally.

Step 404: A first router receives the first LSP packet sent by the management router, where the first LSP packet includes a first TLV, and the first TLV is used to determine the sleeping link to be woken.

The first router may be any router associated with the sleeping link. For example, the first router is either of the two routers connected to the sleeping link. The routers that have received the first LSP packet are the R7 and the R8. The first router may be the R7, and certainly, the first routers may also be the R8. This embodiment is described by using the R7 as an example, and likewise, the R8 also performs same operations.

"First" in the first LSP packet is not used for sequencing, but for convenience of description; and likewise, "first" in the first TLV is also for convenience of description.

The first TLV includes a link type and a link record. The link type is the woken link, and the link record includes a primary MAC address and a secondary MAC address. The primary MAC address is a MAC address of the R7, and the secondary MAC address is a MAC address of the R8.

Step 405: The first router determines, according to the first TLV included in the first LSP packet, the sleeping link to be woken.

In this step, that the R7 determines the sleeping link to be woken includes that: the R7 parses the first LSP packet to acquire the first TLV; the R7 reads the first TLV to acquire the link record included in the first TLV, where, according to the description of step 404, the link type included in the first TLV is the woken link, and the link record includes the primary MAC address and the secondary MAC address. When the link type included in the first TLV is the woken link, the R7 determines that the sleeping link to be woken is the link marked by the link record, that is, the R7 determines that the sleeping link to be woken is the link between the router (R7) and the router (R8), where the router (R7) is a router corresponding to the primary MAC address in the link record, and the router (R8) is a router corresponding to the secondary MAC address in the link record.

Step 406: The first router wakes the sleeping link.

In this step, when the R7 wakes the sleeping link, the R7 sends a wake command to a line card included in the R7. That is, waking the sleeping link actually refers to waking line cards on the routers connected to both sides of the sleeping link. It should be noted that, one router may be connected to multiple routers, and therefore, multiple line cards may be included in one router. One line card identifies one router, and the identified router is a router connected to the router in which the line card is located. Therefore, the line card that needs to be woken and is in the R7 may be determined according to the router corresponding to the secondary MAC address.

The R7 regularly sends a packet to a router connected to the R7, where the packet is used to probe a link state. After sending the wake command to the line card, the R7 starts to regularly send a link probing packet. The process is similar to a process that a packet is sent in a link working normally, which is not described herein again.

When the packet sent by the router corresponding to the secondary MAC address is received, the R7 determines that the line card included in the first router has been woken according to the wake command and is in a working state, and determines that the sleeping link enters a woken state. Only when the routers connected to the sleeping link perform a two-way handshake to determine that the link may receive and send a packet normally, it may be determined that the sleeping link has entered the woken state.

Step 407: The first router sends a second LSP packet, where the second LSP packet is used to notify a router connected to the first router that the sleeping link has entered a woken state.

After the sleeping link enters the woken state, the R7 needs to notify another router that the sleeping link has been in the woken state, thereby triggering route re-convergence of the whole network. When the R7 notifies the another router, a notification may be sent in a form in which the second LSP packet is sent. In this case, the R7 may send the second LSP packet to the management router R1, and then the R1 modifies a state that is of the link between the R7 and the R8 and is in the link state database into the woken link, which is then flooded to all the routers managed by the R1. Alternatively, the R7 may directly send the second LSP packet to another router connected to the R7, and after the R1 receives the second LSP packet, the R1 modifies a state that is of the link between the R7 and the R8 and is in the link state database.

According to the sleeping link waking method provided by this embodiment of the present invention, a management router sends, when detecting that network load rises, a first LSP packet to a first router connected to a sleeping link, and then the first router determines and wakes the sleeping link according to a link type and a link record in a first TLV in the first LSP packet, so that the sleeping link may be automatically woken in a timely manner according to an actual load condition of a network, and therefore, labor maintenance costs can be reduced.

Figure 6:
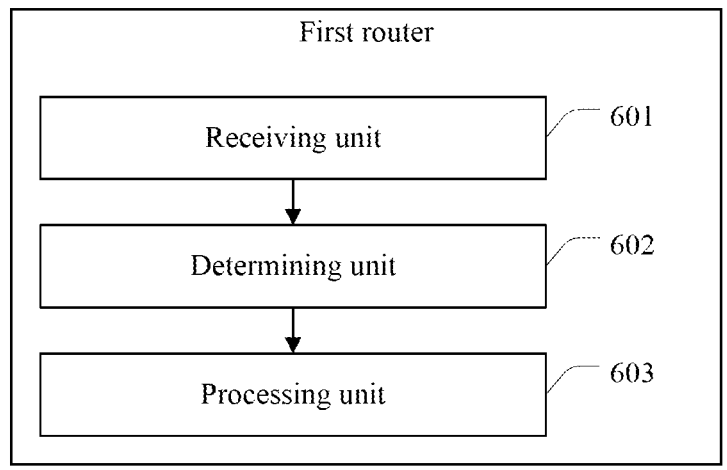
FIG. 6 is a block diagram of a sleeping link waking apparatus (a first router) according to Embodiment 2 of the present invention.

This embodiment of the present invention provides a sleeping link waking apparatus. The apparatus may be a first router, where the first router may be a router associated with a sleeping link. For example, the first router is a router connected to the sleeping link. As shown in FIG. 6, the apparatus includes: a receiving unit 601, a determining unit 602, and a processing unit 603.

The receiving unit 601 is configured to receive a first LSP packet sent by a management router, where the first LSP packet includes a first TLV, and the first TLV is used to determine a sleeping link to be woken.

Optionally, a TLV includes a link record, and the link record includes a primary MAC address and a secondary MAC address. In addition, the TLV further includes a link type, and the link type includes a woken link or a sleeping link. The link type in the first TLV is the woken link, and the link record includes the primary MAC address and the secondary MAC address.

The determining unit 602 is configured to determine, according to the first TLV, the sleeping link to be woken.

The processing unit 603 is configured to wake the sleeping link.

Figure 7:
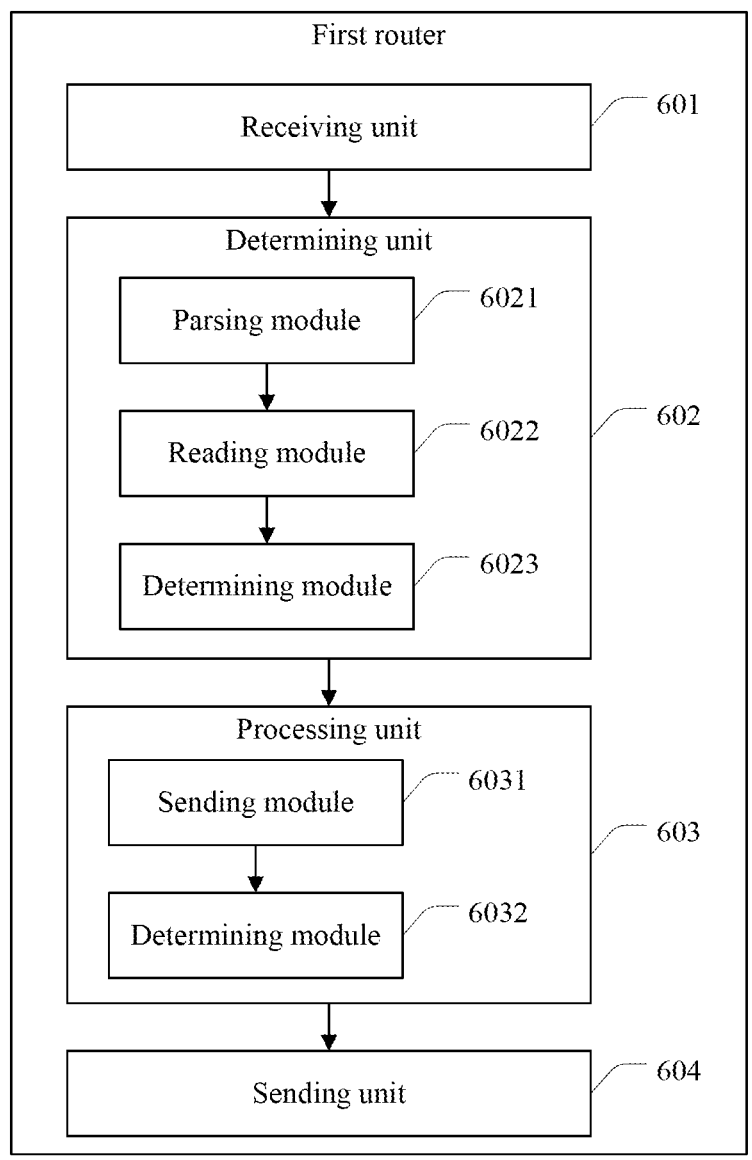
FIG. 7 is a block diagram of another sleeping link waking apparatus (a first router) according to Embodiment 2 of the present invention.

Further optionally, as shown in FIG. 7, the determining unit 602 includes: a parsing module 6021, a reading module 6022, and a determining module 6023.

After the first LSP packet sent by the management router is received, the parsing module 6021 is configured to parse the first LSP packet to acquire the first TLV.

According to the first TLV, the reading module 6022 reads the first TLV to acquire a link record included in the first TLV, where the link type is the woken link, and the link record includes the primary MAC address and the secondary MAC address. In another implementation manner, the link record may include an SNPA, and a router connected to the sleeping link may be determined by using an SNPA address. The present invention is described in detail by using an example in which the link record includes the primary MAC address and the secondary MAC address.

The determining module 6023 is configured to determine that the sleeping link to be woken is a link marked by the link record. Optionally, the determining module 6023 is configured to determine that the sleeping link to be woken is a link between a first router and a second router, where the first router is a router corresponding to the primary MAC address in the link record, and the second router is a router corresponding to the secondary MAC address in the link record.

Further optionally, as shown in FIG. 7, the processing unit 603 includes: a sending module 6031 and a determining module 6032.

After the sleeping link to be woken is determined, the sending module 6031 is configured to send a wake command to a line card included in the apparatus, where the apparatus is the sleeping link waking apparatus provided by this embodiment of the present invention.

Waking the sleeping link actually refers to waking line cards on routers connected to both sides of the sleeping link. It should be noted that, one router may be connected to multiple routers, and therefore, multiple line cards may be included in one router. One line card identifies one router, and the identified router is a router connected to the router in which the line card is located. Therefore, the line card that needs to be woken and is in the apparatus may be determined according to the router corresponding to the secondary MAC address.

The sending module 6031 is further configured to regularly send a packet to a router connected to the apparatus, where the packet is used to probe a link state. After sending the wake command to the line card, the sending module 6031 starts to regularly send a link probing packet. The process is similar to a process that a packet is sent in a link working normally, which is not described herein again.

When the packet sent by the router corresponding to the secondary MAC address is received, the determining module 6032 determines that the line card included in the first router has been woken according to the wake command and is in a working state, and determines that the sleeping link enters a woken state.

It should be noted that, only when the routers connected to the sleeping link perform a two-way handshake to determine that the link may receive and send a packet normally, it may be determined that the sleeping link has entered the woken state.

Further optionally, as shown in FIG. 7, the apparatus further includes a sending unit 604.

After the sleeping link enters the woken state, the sending unit 604 is configured to send a second LSP packet, where the second LSP packet is used to notify the router connected to the apparatus that the sleeping link has entered the woken state, thereby triggering route re-convergence of the whole network.

According to the sleeping link waking apparatus provided by this embodiment of the present invention, a determining unit determines, according to a first TLV in a received first LSP packet, a sleeping link to be woken, and a processing unit wakes the sleeping link, so that the sleeping link may be automatically woken in a timely manner according to an actual load condition of a network, and therefore, labor maintenance costs can be reduced.

Figure 8:
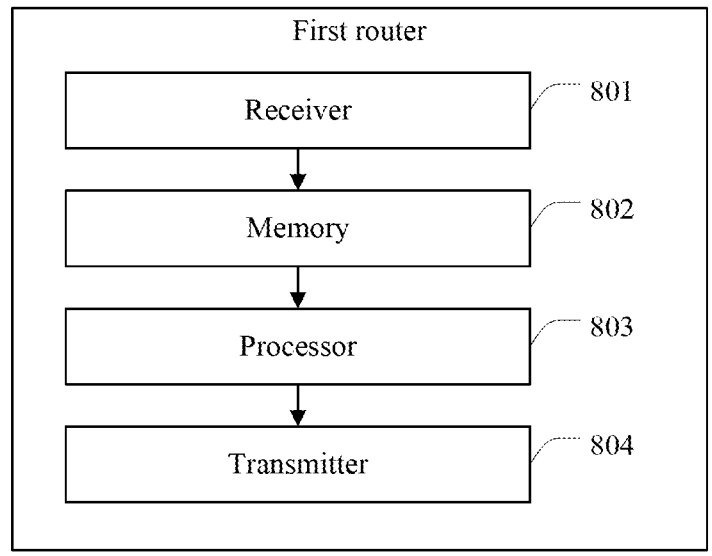
FIG. 8 is a block diagram of another sleeping link waking apparatus (a first router) according to Embodiment 2 of the present invention.

This embodiment of the present invention provides another sleeping link waking apparatus. The apparatus may be a first router, where the first router may be a router associated with a sleeping link. For example, the first router is a router connected to the sleeping link. As shown in FIG. 8, the apparatus includes: a receiver 801, a memory 802, a processor 803, and a transmitter 804.

The receiver 801 is configured to receive a first LSP packet sent by a management router, where the first LSP packet includes a first TLV, and the first TLV is used to determine a sleeping link to be woken.

Optionally, a TLV includes a link record, and the link record includes a primary MAC address and a secondary MAC address. In addition, the TLV further includes a link type, and the link type includes a woken link or a sleeping link. The link type in the first TLV is the woken link, and the link record includes the primary MAC address and the secondary MAC address. It should be noted that, the link record may further include a subnetwork point of attachment SNPA, and a router connected to the sleeping link may be determined by using an SNPA address. The present invention is described in detail by using an example in which the link record includes the primary MAC address and the secondary MAC address.

The memory 802 is configured to store information including program routines.

The processor 803, coupled to the memory, the receiver, and the transmitter, is configured to control execution of the program routines, which specifically includes: determining, according to the first TLV included in the first LSP packet, the sleeping link to be woken; and waking the sleeping link.

Further optionally, when the processor 803 determines, according to the first TLV included in the first LSP packet, the sleeping link to be woken, specifically the processor 803 parses the first LSP packet to acquire the first TLV after the first LSP packet sent by the management router is received. According to the first TLV, the processor 803 reads the first TLV to acquire a link record included in the first TLV, where the link type is the woken link, and the link record includes the primary MAC address and the secondary MAC address. When the link type is the woken link, the processor 803 determines that the sleeping link to be woken is a link marked by the link record. Optionally, it is determined that the sleeping link to be woken is a link between a first router and a second router, where the first router is a router corresponding to the primary MAC address in the link record, and the second router is a router corresponding to the secondary MAC address in the link record.

Further optionally, when the processor 803 wakes the sleeping link, specifically the processor 803 after the sleeping link to be woken is determined, sends a wake command to a line card included in the apparatus, where the apparatus is the sleeping link waking apparatus provided by this embodiment of the present invention. Waking a sleeping link actually refers to waking line cards on routers connected to both sides of the sleeping link; it should be noted that, one router may be connected to multiple routers, and therefore, multiple line cards may be included in one router. One line card identifies one router, and the identified router is a router connected to the router in which the line card is located. Therefore, the line card that needs to be woken and is in the apparatus may be determined according to the router corresponding to the secondary MAC address. A packet is regularly sent to a router connected to the apparatus, where the packet is used to probe a link state. When the packet sent by the router corresponding to the secondary MAC address is received, the processor 803 determines that the line card included in the first router has been woken according to the wake command and is in a working state, and determines that the sleeping link enters a woken state.

It should be noted that, only when the routers connected to the sleeping link perform a two-way handshake to determine that the link may receive and send a packet normally, it may be determined that the sleeping link has entered the woken state.

After the sleeping link enters the woken state, the transmitter 804 is configured to send a second LSP packet, where the second LSP packet is used to notify the router connected to the apparatus that the sleeping link has entered the woken state, thereby triggering route re-convergence of the whole network.

It should be noted that, because content such as specific implementation processes of various modules and information exchange between the various modules in the apparatus shown in FIG. 8 is based on a same invention concept as the method embodiment of the present invention, reference may be made to the method embodiment, and details are not described herein again.

According to the sleeping link waking apparatus provided by this embodiment of the present invention, a processor determines and wakes, according to a first TLV in a received first LSP packet, a sleeping link to be woken, so that the sleeping link may be automatically woken in a timely manner according to an actual load condition of a network, and therefore, labor maintenance costs can be reduced.

Figure 9:
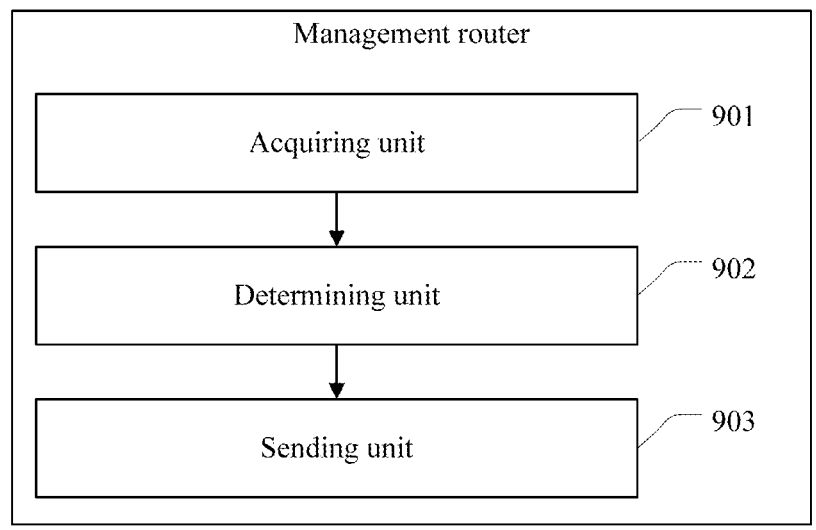
FIG. 9 is a block diagram of a sleeping link waking apparatus (a management router) according to Embodiment 2 of the present invention.

This embodiment of the present invention provides a sleeping link waking apparatus, and as shown in FIG. 9, the apparatus may be a management router. The apparatus includes: an acquiring unit 901, a determining unit 902, and a sending unit 903.

The acquiring unit 901 is configured to acquire and record sleeping link information.

The determining unit 902 determines, according to the sleeping link information, two routers connected to a sleeping link.

The sending unit 903 is configured to send a first LSP packet to the two routers, so as to wake the sleeping link between the routers, where the first LSP packet includes a first TLV, and the first TLV is used to determine the sleeping link to be woken.

Figure 10:
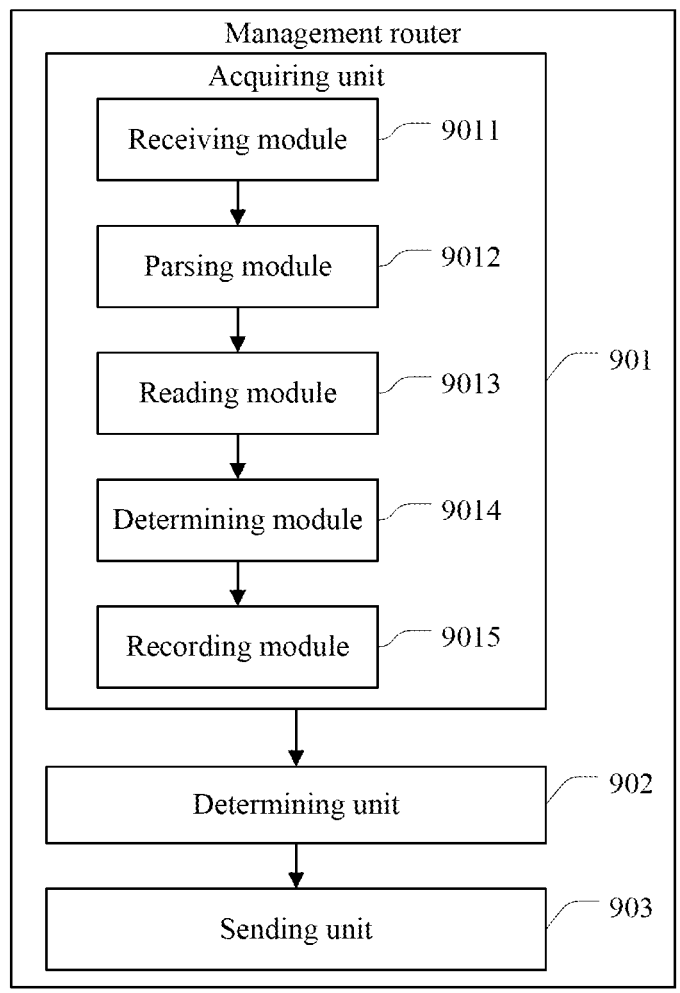
FIG. 10 is a block diagram of another sleeping link waking apparatus (a management router) according to Embodiment 2 of the present invention.

Further optionally, as shown in FIG. 10, the acquiring unit 901 includes: a receiving module 9011, a parsing module 9012, a reading module 9013, a determining module 9014, and a recording module 9015.

The receiving module 9011 is configured to receive a third LSP packet sent by a router except the two routers connected to the sleeping link, where the third LSP packet includes a third TLV, and the third TLV is used to determine the sleeping link information.

Optionally, a TLV includes a link Type and a link record. The link type includes a woken link or a sleeping link, and the link record includes a primary MAC address and a secondary MAC address. The third TLV includes the link type and the link record. The link type is the sleeping link, and the link record includes the primary MAC address and the secondary MAC address. It should be noted that, the link record may further include a subnetwork point of attachment SNPA, and a router connected to the sleeping link may be determined by using an SNPA address. The present invention is described in detail by using an example in which the link record includes the primary MAC address and the secondary MAC address.

The parsing module 9012 is configured to parse the third LSP packet to acquire the third TLV.

The reading module 9013 is configured to read the third TLV to acquire the link record included in the third TLV.

The determining module 9014 is configured to determine that the sleeping link is a link marked by the link record, and determine the two routers connected to the sleeping link.

Further optionally, the two routers connected to the sleeping link are a first router and a second router. The determining module 9014 is specifically configured to determine that the sleeping link is a link between the first router and the second router, where the first router is a router corresponding to the primary MAC address in the link record, and the second router is a router corresponding to the secondary MAC address in the link record.

The recording module 9015 is configured to record, in a link state database, the sleeping link and the two routers connected to the sleeping link.

The link state database stores states of all links on a network managed by the management router.

Further optionally, the determining unit 902 is configured to acquire, in the link state database, the two routers connected to the sleeping link.

According to the sleeping link waking apparatus provided by this embodiment of the present invention, a determining unit determines, according to acquired sleeping link information, a router connected to a sleeping link; and a sending unit sends a first LSP packet to the router connected to the sleeping link when it is detected that network load rises, so as to wake the sleeping link, so that the sleeping link may be automatically woken in a timely manner according to an actual load condition of a network, and therefore, labor maintenance costs can be reduced.

Figure 11:
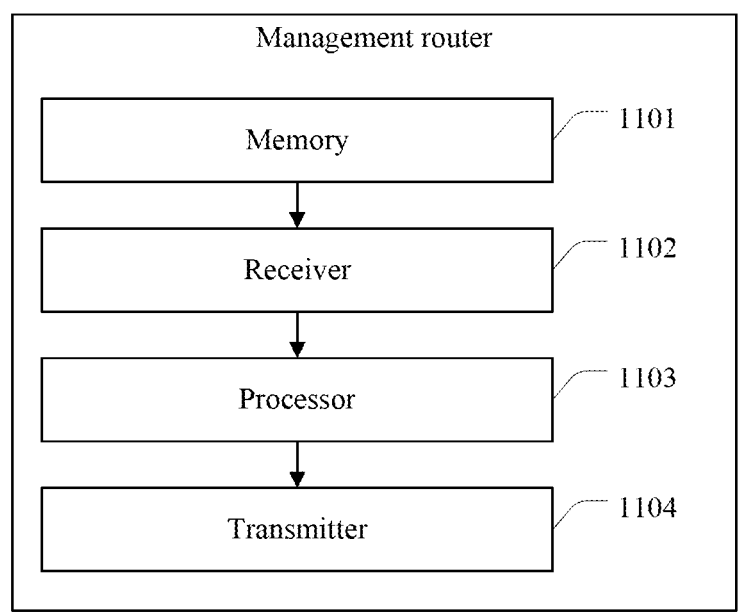
FIG. 11 is a block diagram of another sleeping link waking apparatus (a management router) according to Embodiment 2 of the present invention.

This embodiment of the present invention provides another sleeping link waking apparatus, and as shown in FIG. 11, the apparatus may be a management router. The apparatus includes: a memory 1102, a receiver 1101, a processor 1103, and a transmitter 1104.

The memory 1101 is configured to store information including program routines.

The receiver 1102 is configured to acquire sleeping link information. Optionally, the receiver 1102 receives a third LSP packet sent by a router except two routers connected to a sleeping link, where the third LSP packet includes a third TLV, and the third TLV is used to determine the sleeping link information.

Further, the processor 1103, coupled to the memory, the receiver and the transmitter, is configured to control execution of the program routines, which specifically includes: recording the sleeping link information according to the acquired sleeping link information; and determining, according to the sleeping link information, the two routers connected to the sleeping link.

The transmitter 1104 is configured to send a first LSP packet to the two routers, so as to wake the sleeping link between the two routers, where the first LSP packet includes a first TLV, and the first TLV is used to determine the sleeping link to be woken.

Further optionally, after the receiver 1102 receives the third LSP packet sent by the router except the two routers connected to the sleeping link, the processor 1103 is further configured to parse the third LSP packet to acquire a third TLV; read the third TLV to acquire a link record included in the third TLV; and determine that the sleeping link is a link marked by the link record, and determine the two routers connected to the sleeping link.

Further optionally, the two routers connected to the sleeping link are a first router and a second router. That the processor 1103 is configured to determine that the sleeping link is the link marked by the link record includes that: the processor 1103 determines that the sleeping link is the link between the first router and the second router, where the first router is a router corresponding to a primary MAC address in the link record, and the second router is a router corresponding to a secondary MAC address in the link record.

Further optionally, when recording the sleeping link information, the processor 1103 records, in a link state database, the sleeping link and the two routers connected to the sleeping link.

Further optionally, that the processor 1103 determines the routers connected to the sleeping link according to the sleeping link information specifically includes that: the processor 1103 acquires, in the link state database, the two routers connected to the sleeping link.

According to the sleeping link waking apparatus provided by this embodiment of the present invention, a processor determines, according to acquired sleeping link information, a router connected to a sleeping link, and a transmitter sends a first LSP packet to the router connected to the sleeping link when it is detected that network load rises, so as to wake the sleeping link, so that the sleeping link may be automatically woken in a timely manner according to an actual load condition of a network, and therefore, labor maintenance costs can be reduced.

It should be noted that the described apparatus embodiment is merely exemplary. The units described as separate parts may or may not be physically separated, and parts displayed as units may or may not be physical units, may be located in one position, or may be distributed on a plurality of network units. A part or all of the modules may be selected according to actual needs to achieve the objectives of the solutions of the embodiments. A person of ordinary skill in the art may understand and implement the embodiments of the present invention without creative efforts.

Based on the description of the foregoing implementation manners, a person skilled in the art may clearly understand that the present invention may be implemented by software in addition to necessary universal hardware, or by dedicated hardware, including a dedicated integrated circuit, a dedicated CPU, a dedicated memory, a dedicated component, and the like. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present invention.

The embodiments in this specification are all described in a progressive manner, for same or similar parts in the embodiments, reference may be made to each other, and each embodiment focuses on a difference from other embodiments. Especially, apparatus and system embodiments are basically similar to a method embodiment, and therefore are described briefly; for related parts, reference may be made to partial descriptions in the method embodiment.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A sleeping link waking method comprising:
receiving, by a first router, a first Link State Protocol Data Unit (LSP) packet sent by a management router to a plurality of routers in a network, the management router being configured to manage the plurality of routers, wherein the first LSP packet comprises a first Type, Length, and Value (TLV), and the first TLV comprises a link type and a link record, wherein the link record identifies a first link that connects two routers in the plurality of routers, and the link type can be a first type indicating that the first link is a sleeping link that needs to be woken from a sleeping state or a second type indicating that the first link is in a woken state, and wherein when the link type is the first type, the LSP packet instructs to wake up the first link and the LSP packet is used to determine a sleeping link to be woken;
when the link type is the first type, determining, by the first router according to the first TLV, the sleeping link to be woken; and
waking, by the first router, the sleeping link.

2. The method according to claim 1, wherein the determining, by the first router according to the first TLV, the sleeping link to be woken comprises:
parsing, by the first router, the first LSP packet, to acquire the first TLV;
reading, by the first router, the first TLV, to acquire the link record comprised in the first TLV; and
determining, by the first router, that the sleeping link to be woken is a link marked by the link record.

3. The method according to claim 2, wherein the link record comprises a primary Media Access Control (MAC) address and a secondary MAC address.

4. The method according to claim 3, wherein the determining, by the first router, that the sleeping link to be woken is a link marked by the link record comprises:
determining, by the first router, that the sleeping link to be woken is a link between the first router and a second router, wherein the first router is a router corresponding to the primary MAC address in the link record, and the second router is a router corresponding to the secondary MAC address in the link record.

5. The method according to claim 4, wherein the waking, by the first router, the sleeping link comprises:
sending, by the first router, a wake command to a line card comprised in the first router;
regularly sending, by the first router, a packet to a router connected to the first router; and
when the packet sent by the router corresponding to the secondary MAC address is received, determining, by the first router, that the line card comprised in the first router has been woken according to the wake command and is in a working state, and determining that the sleeping link enters a woken state.

6. The method according to claim 5, after the waking, by the first router, the sleeping link, further comprising:
sending, by the first router, a second LSP packet, wherein the second LSP packet is used to notify a router connected to the first router that the sleeping link has entered the woken state.

7. A sleeping link waking apparatus comprising:
a receiver configured to receive a first Link State Protocol Data Unit (LSP) packet sent by a management router to a plurality of routers in a network that are managed by the management router, wherein the first LSP packet comprises a first Type, Length, and Value (TLV), and the first TLV comprises a link type and a link record, wherein the link record identifies a link that connects two routers in the plurality of routers, and the link type can be a first type indicating that the link is a sleeping link to be woken or a second type indicating that the link is in a woken state, and wherein when the link type is the first type, the LSP packet instructs to wake up the sleeping link and the LSP packet is used to determine the sleeping link to be woken;
a processor configured to execute instructions to
when the link type is the first type, determine, according to the first TLV, that the sleeping link identified in the link record of the LSP packet to be woken is a first link connecting the sleeping link waking apparatus and a second router; and
wake the sleeping link.

8. The apparatus according to claim 7, wherein the processor is further configured to execute instructions to
parse the first LSP packet, to acquire the first TLV;
read the first TLV, to acquire the link record comprised in the first TLV; and
determine that the sleeping link to be woken is a link marked by the link record.

9. The apparatus according to claim 8, wherein the link record comprises a primary Media Access Control (MAC) address and a secondary MAC address.

10. The apparatus according to claim 9, wherein the processor is further configured to execute instructions to
determine that the sleeping link to be woken is a link between the sleeping link waking apparatus and the second router, wherein the sleeping link waking apparatus is a router corresponding to the primary MAC address in the link record, and the second router is a router corresponding to the secondary MAC address in the link record.

11. The apparatus according to claim 10, wherein the processor is further configured to execute instructions to
send a wake command to a line card comprised in the apparatus;
regularly send a packet to a router connected to the apparatus; and
when the packet sent by the router corresponding to the secondary MAC address is received, determine that the line card comprised in the apparatus has been woken according to the wake command and is in a working state, and determine that the sleeping link enters a woken state.

12. The apparatus according to claim 11, wherein the processor is further configured to execute instructions to
send a second LSP packet, wherein the second LSP packet is used to notify a router connected to the apparatus that the sleeping link has entered the woken state.

13. A sleeping link waking apparatus comprising:
a processor; and
a computer-readable storage medium storing a program to be executed by the processor, the program including instructions for:
acquiring and recording sleeping link information, the sleeping link information indicating sleeping links and routers connecting to each of the sleeping links;
determining according to the sleeping link information, two routers connected to each of the sleeping links; and
sending a first link state protocol data unit (LSP) packet to a plurality of routers managed by the sleeping link waking apparatus wherein the first LSP packet comprises a first Type, Length, and Value (TLV), and the first TLV comprises a link type and a first link record, wherein the first link record identifies a link that connects two routers in the plurality of routers, and the link type can be a first type indicating that the link is a sleeping link to be woken or a second type indicating that the link is in a woken state, wherein when the link type is the first type, the LSP packet instructs to wake up the sleeping link and the LSP packet is used to determine the sleeping link to be woken, and wherein the link is one of the sleeping links indicated by the sleeping link information, and the LSP packet enables a router to determine, when the link type is the first type, the sleeping link connecting to the router and wake the sleeping link.

14. The apparatus according to claim 13, wherein the instructions for acquiring and recording comprise instructions to:
receive a third LSP packet sent by a router except routers connected to the sleeping links indicated by the sleeping link information, wherein the third LSP packet comprises a third TLV, and the third TLV is used to determine the sleeping link information;
parse the third LSP packet to acquire the third TLV;
read the third TLV to acquire a second link record comprised in the third TLV;
determine a second sleeping link that is marked by the second link record, and determine two routers connected to the second sleeping link; and
record, in a link state database, the second sleeping link and the two routers connected to the second sleeping link.

15. The apparatus according to claim 14, wherein the instructions for determining according to the sleeping link information comprises instructions to:
acquire, in the link state database, the two routers connected to the second sleeping link.

16. The apparatus according to claim 15, wherein the second link record comprises a primary Media Access Control (MAC) address and a secondary MAC address.

17. The apparatus according to claim 16, wherein the two routers connected to the second sleeping link are a first router and a second router; and
wherein the instructions to determine the second sleeping link that is marked by the second link record, and determine the two routers connected to the second sleeping link comprise instructions to
determine that the second sleeping link is a link between the first router and the second router, wherein the first router is a router corresponding to the primary MAC address in the second link record, and the second router is a router corresponding to the secondary MAC address in the second link record.

* * * * *